United States Patent
Denk et al.

(10) Patent No.: US 9,732,526 B2
(45) Date of Patent: Aug. 15, 2017

(54) SYSTEM OF COMPONENTS WHICH, ASSEMBLED, FORM A RAINWATER SEPARATOR FOR A DOWNPIPE

(71) Applicant: WISY AG Haustechniksysteme, Filtertechnik, Kefenrod (DE)

(72) Inventors: Arnold Denk, Gedern (DE); Jan Maurer, Witzenhausen (DE)

(73) Assignee: WISY AG Haustechniksysteme, Filtertechnik, Kefenrod (DE)

( * ) Notice: Subject to any disclaimer, the term of this patent is extended or adjusted under 35 U.S.C. 154(b) by 0 days.

(21) Appl. No.: 14/765,793

(22) PCT Filed: Feb. 3, 2014

(86) PCT No.: PCT/DE2014/000037
§ 371 (c)(1),
(2) Date: Aug. 4, 2015

(87) PCT Pub. No.: WO2014/121779
PCT Pub. Date: Aug. 14, 2014

(65) Prior Publication Data
US 2016/0017610 A1   Jan. 21, 2016

(30) Foreign Application Priority Data
Feb. 6, 2013   (DE) .................. 10 2013 002 013

(51) Int. Cl.
*E03B 3/03* (2006.01)
*E04D 13/076* (2006.01)
(Continued)

(52) U.S. Cl.
CPC ....... *E04D 13/0767* (2013.01); *B01D 29/085* (2013.01); *B01D 35/02* (2013.01);
(Continued)

(58) Field of Classification Search
CPC ............... E04D 13/0767; E04D 13/08; E04D 2013/0813; E04D 2013/086;
(Continued)

(56) References Cited

U.S. PATENT DOCUMENTS

| | | | | |
|---|---|---|---|---|
| 3,398,830 A | * | 8/1968 | Hornquist | E04D 13/08 210/459 |
| 4,470,908 A | * | 9/1984 | Odekirk | E04D 13/08 210/463 |
| 5,114,594 A | * | 5/1992 | Rosebrock | E04D 13/08 210/459 |
| 5,406,966 A | * | 4/1995 | Lepkowski | E04D 13/076 210/162 |
| 5,452,546 A | * | 9/1995 | Goddard | E04D 13/08 210/170.03 |

(Continued)

FOREIGN PATENT DOCUMENTS

| | | |
|---|---|---|
| DE | 38 12 136 A1 | 2/1989 |
| DE | 297 22 568 U1 | 5/1999 |
| DE | 102012022586 * | 5/2014 |
| EP | 0 548 397 A1 | 6/1993 |

(Continued)

OTHER PUBLICATIONS

German Search Report dated Dec. 11, 2013, with English translation (Twelve (12) pages).
(Continued)

*Primary Examiner* — Christopher Upton
(74) *Attorney, Agent, or Firm* — Crowell & Moring LLP

(57) ABSTRACT

A system of components, which, when assembled, form a rainwater separator for a downpipe is disclosed. The system includes, among other things, a screen for fine filtering of the rainwater. In a first assembly arrangement, the parts are assembled to form a rainwater separator with the screen so that the filtered water can be used as non-potable water for the household. In a second assembly arrangement, the screen is omitted, so that the water obtained from the rainwater separator may be utilized for watering the garden, for example.

7 Claims, 3 Drawing Sheets

(51) Int. Cl.
*E04D 13/08* (2006.01)
*B01D 29/085* (2006.01)
*B01D 35/02* (2006.01)
*E03B 3/02* (2006.01)
*E03B 1/04* (2006.01)

(52) U.S. Cl.
CPC ............... *E03B 3/03* (2013.01); *E04D 13/08* (2013.01); *E03B 3/02* (2013.01); *E03B 2001/047* (2013.01); *E04D 2013/082* (2013.01); *E04D 2013/086* (2013.01); *E04D 2013/0813* (2013.01); *E04D 2013/0873* (2013.01)

(58) Field of Classification Search
CPC . E04D 2013/0873; E03B 13/02; E03B 13/03; E03B 3/02; E03B 3/03; B01D 35/02
USPC .......... 210/162, 170.03, 459, 463; 52/12, 16
See application file for complete search history.

(56) References Cited

U.S. PATENT DOCUMENTS

| | | | |
|---|---|---|---|
| 8,926,836 B2* | 1/2015 | Takai | ..................... E04D 13/08 210/162 |
| 2011/0100887 A1* | 5/2011 | Ballistreri | ............... E04D 13/08 210/170.03 |

FOREIGN PATENT DOCUMENTS

| | | |
|---|---|---|
| EP | 1 911 892 A1 | 4/2008 |
| GB | 2 391 182 A | 2/2004 |

OTHER PUBLICATIONS

PCT/DE2014/000037, International Search Report (PCT/ISA/220 and PCT/ISA/210) dated Jul. 10, 2014, with partial English translation, enclosing Written Opinion of the International Searching Authority (PCT/ISA/237) (Twelve (12) pages).

\* cited by examiner

SYSTEM OF COMPONENTS WHICH, ASSEMBLED, FORM A RAINWATER SEPARATOR FOR A DOWNPIPE

This application claims the priority of International Application No. PCT/DE2014/000037, filed Feb. 3, 2014, and German Patent Document No. 10 2013 002 013.1, filed Feb. 6, 2013, the disclosures of which are expressly incorporated by reference herein.

BACKGROUND AND SUMMARY OF THE INVENTION

The invention relates to a system of components, which, when assembled, form a rainwater separator for a downpipe. The system consists of
- a cylindrical screen,
- a cylindrical housing tube,
- a ring-shaped lid having an inlet connection for the rainwater,
- a ring-shaped collecting basin, having an inside wall and an outside wall and forming a central water outlet.

The dimensions of the screen, of the housing tube, of the ring-shaped lid and the collecting basin are selected, so that, in a first assembly arrangement, they can be arranged so that
- the screen is arranged in the housing tube concentrically with the longitudinal axis of the housing tube, so that an annular space is formed between the screen and the housing tube,
- the annular space is sealed at its bottom by a ring-shaped collecting basin, wherein the screen sits on the edge of the inside wall,
- the cylindrical inlet connection for the rainwater is arranged relative to the longitudinal axis of the screen and its lower edge is immersed in the upper end face of the screen.

One such rainwater separator is described in DE 38 12 136 A1. The rainwater runs down the inside wall of the downpipe and goes through the inlet connection into the cylindrical screen.

In the screen, which is preferably a fine screen, a portion of the water is drawn outward due to adhesion forces and thus, having been finely filtered, enters the annular space and goes from there into the collecting basin, which has an outlet at the side. The unfiltered water enters the central water outlet and from there enters the lower portion of the downpipe.

The water filtered in this way can be used as non-potable water in the household, e.g., for flushing a toilet or for a washing machine. However, such fine filtering through a fine screen is not always necessary. For example, coarse filtering is sufficient if the water is needed only for watering the garden, for example. Such rainwater separators are known.

The invention is based on the object of creating a system whose components can be utilized to separate both non-potable water and garden watering water from a downpipe for rainwater.

To achieve this object, the invention provides that the outside wall of the collecting basin and the upper edge of the housing tube shall have the same contour, so that the ring-shaped lid can be placed on the housing tube as well as on the outside wall of the collecting basin, so that it sits tightly, but the dimensions of the ring-shaped lid and the collecting basin are also selected, so that they can be arranged in a second assembly arrangement in such a way that the ring-shaped lid can be placed directly on the outside wall of the collecting basin, omitting the screen and the housing tube, such that the lower edge of the cylindrical inlet connection is situated radially outside of the inside wall of the collecting basin, so that the rainwater can enter the collecting basin directly.

A fine filtering is thus performed in the first assembly arrangement, so that the filtered rainwater can be used as non-potable water. The screen and the housing tube are omitted in the second assembly arrangement. Instead, the ring-shaped lid is placed directly on the collecting basin, so that the rainwater can enter the collecting basin directly—and at least is not finely filtered.

According to the invention, the ring-shaped lid fits the housing tube as well as the collecting basin, so the same parts can also be used to implement either one assembly arrangement or the other assembly arrangement. This greatly simplifies the provisioning of parts.

The yield of water is particularly great when, in the second assembly arrangement, the lower edge of the cylindrical inlet connection is inserted into the collecting basin.

In order for the water entering the rainwater separator from the downpipe to strike the screen surface, the invention provides that the screen has a conical downward taper, so that the diameter of the lower edge of the inlet connection is smaller than the largest diameter of the screen, so that in the first assembly arrangement, the lower edge of the inlet connection runs over the conical inside wall of the screen in a vertical projection.

However, it has been found that at least a coarse filtering must also be accomplished in the second assembly arrangement, so that coarse pieces, such as leaves and small branches, are not added to the collecting basin. Therefore, the invention provides that a coarse ring-shaped screen is part of the system and its dimensions are selected so that, in the second assembly arrangement, it is arranged between the lower edge of the cylindrical inlet connection and the inside wall of the collecting basin. This coarse filter may optionally be used when the rainwater is expected to be heavily loaded with large pieces.

In both assembly arrangements, the yield can be increased if the rainwater is distributed as uniformly as possible on the circumference of the inlet connection when it runs into the screen and/or onto the coarse screen. The invention therefore provides that the inside wall of the inlet connection is furnished with grooves or webs, which run helically and achieve a uniform distribution of the water flowing into the inlet connection over its circumferential area.

To achieve a large volume of the collecting basin, on the one hand, and to permit a small distance of the downpipe and the rainwater separator from the wall of the house, on the other hand, the invention provides that the outside contour of the ring-shaped lid of the housing tube and the collecting basin each have a corresponding rectangular or elliptical cross section. Fundamentally, however, a conventional round cross section may also still be selected.

The rectangle may have straight edges but may also be formed by two line segments running parallel and two convex curvatures connecting the line segments to one another.

The invention will now be explained in greater detail below on the basis of an exemplary embodiment.

DETAILED DESCRIPTION OF THE DRAWINGS

Figure 1:
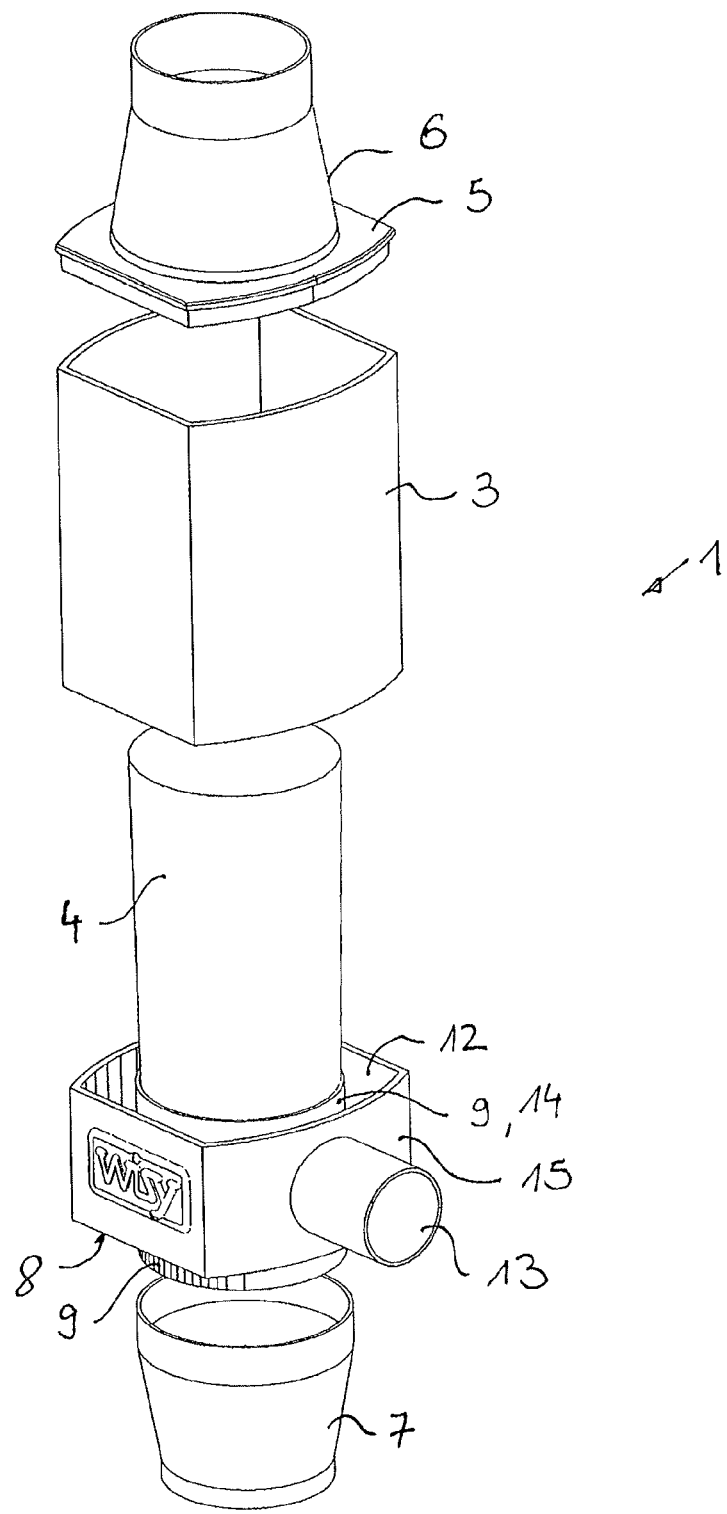
FIG. 1 shows an exploded diagram of a system according to the invention in a first assembly arrangement, so that a rainwater separator for finely filtered process water is formed, FIGS. 2 a, b show a closed diagram and an exploded diagram of a system according to the invention in a second assembly arrangement, so that a rainwater separator for coarsely filtered garden water is formed.

FIG. 1 shows a housing of a rainwater separator 1. The housing consists of a housing tube 3, in which a cylindrical screen 4 is arranged concentrically.

On its upper end, the housing tube 3 is covered by a ring-shaped lid 5, which is in the form of a ring with a central inlet connection 6. The inlet connection 6 is inserted into the upper part of a downpipe (not shown here), which leads to a rain gutter. The bottom part of the housing tube 3 is closed by a bottom 8 having a central outlet connection 9. The outlet connection 9 is connected to the bottom part of the downpipe 7, leading to a wastewater channel.

The upper end of the cylindrical screen 4 is widened in a funnel shape while the lower end of the inlet connection 6 is inserted into the funnel-shaped enlargement beneath the ring-shaped lid 5, so that the water flowing in through the inlet connection 6 enters the interior of the screen 4. The lower end of the screen 4 is placed on the outlet connection 9.

Rainwater does not fall through the downpipe 7 centrally but instead runs down along its inside walls, so that the water flowing into the screen 4 through the inlet connection 6 is running in the opposite direction on the inside wall of the screen 4. The screen 4 is formed from two layers, which are not shown in greater detail here. The inner layer is a metallic cloth that normally does not allow the water flowing by it to pass through. The pores of the cloth are smaller than droplets of water, which, due to the surface tension of water, do not become small enough to be able to pass through the pores.

The outer layer, which is made of a perforated sheet metal that is in contact with the inner layer only in the upper region, is therefore connected to the inner layer toward the outside.

The rainwater that has penetrated through the inner layer toward the outside enters a ring-shaped collecting basin 12, which is formed in the bottom 8 of the housing, and is sent from there through a water outlet 13 at the side to a cistern (not shown here).

The collecting basin 12 consists of a cylindrical inside wall 14 and an outside wall 15 that is concentric with the latter. The inside wall 14 forms the drain connection 9, and the outside wall 15 is formed by the raised edge of the bottom 8.

To achieve a uniform distribution of water on the surface of the screen, the inside wall of the inlet connection 6—which is not shown here—is provided with a plurality of grooves or webs, which are distributed on the circumference and form an angle of 15°-30° with the vertical, which yields a slope of 60°-85°.

The deciding factor is also that the lower edge of the inlet connection 6 is directed outward, so that the water running off the edge is directed toward the screen surface as much as possible.

Figure 2A:
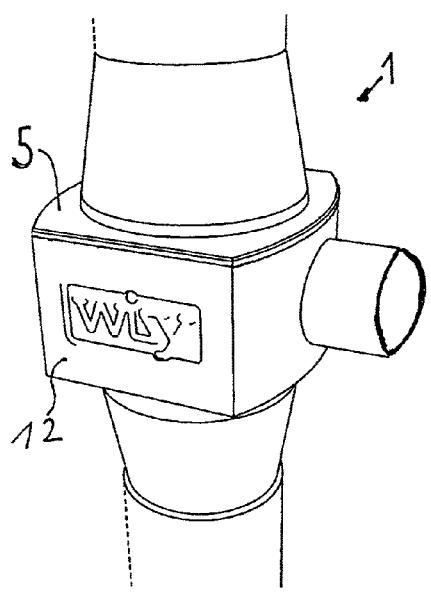
Figure 2B:
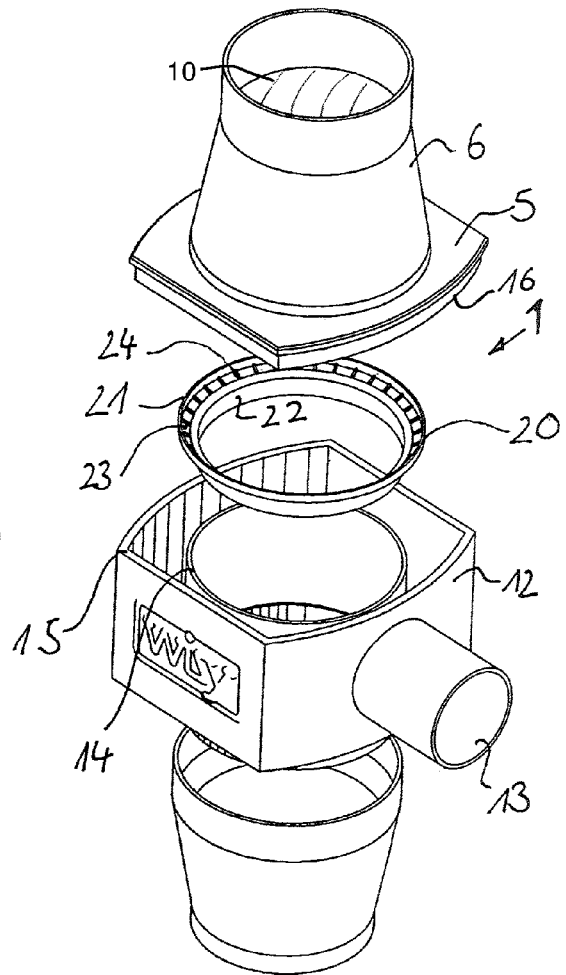

FIG. 2 shows another assembly arrangement. With this assembly arrangement, the housing tube 3 and the screen 4 are omitted. The ring-shaped lid 5 is placed directly on the collecting basin 12, wherein a peripheral web 16 on the ring-shaped lid 5 engages in the collecting basin 12 and is in contact with the inside of the outside wall 15 of the collecting basin 12. The lower edge of the inlet connection 6 lies outside of the inside wall of the collecting basin 12, so that water running off the edge of the inlet connection 6 goes directly into the collecting basin 12.

In the embodiment shown here, a coarse ring-shaped screen 20 having a slightly conical shape is optionally also provided, so that its outer edge 21, which is situated further toward the top, can be attached to the lower edge of the inlet connection 6, while the inner edge 22 at the bottom is placed on the inside wall 14 of the collecting basin 12. The region between the outer edge 21 and the inner edge 22 is provided with a plurality of openings 23, which are separated from one another by a web 24 connecting the inner edge and the outer edge. These webs 24 form a coarse grid, which retains coarse solids such as leaves, small twigs, etc., and directs them into the central outlet connection 9 that leads to the bottom part of the downpipe. However, most of the rainwater passes through the openings 23 into the collecting basin, where it is diverted into a rain barrel, for example, by way of the water outlet 13 at the side.

As shown in FIGS. 1 and 2, the housing tube 3, the ring-shaped lid 5 and the collecting basin 12 have a rectangular outer contour formed by two straight line segments and two convex line segments. Fundamentally, however, a round cross section may also be chosen for the housing tube 3, the ring-shaped lid 5 and the collecting basin 12, as is customary.

Figure 3:
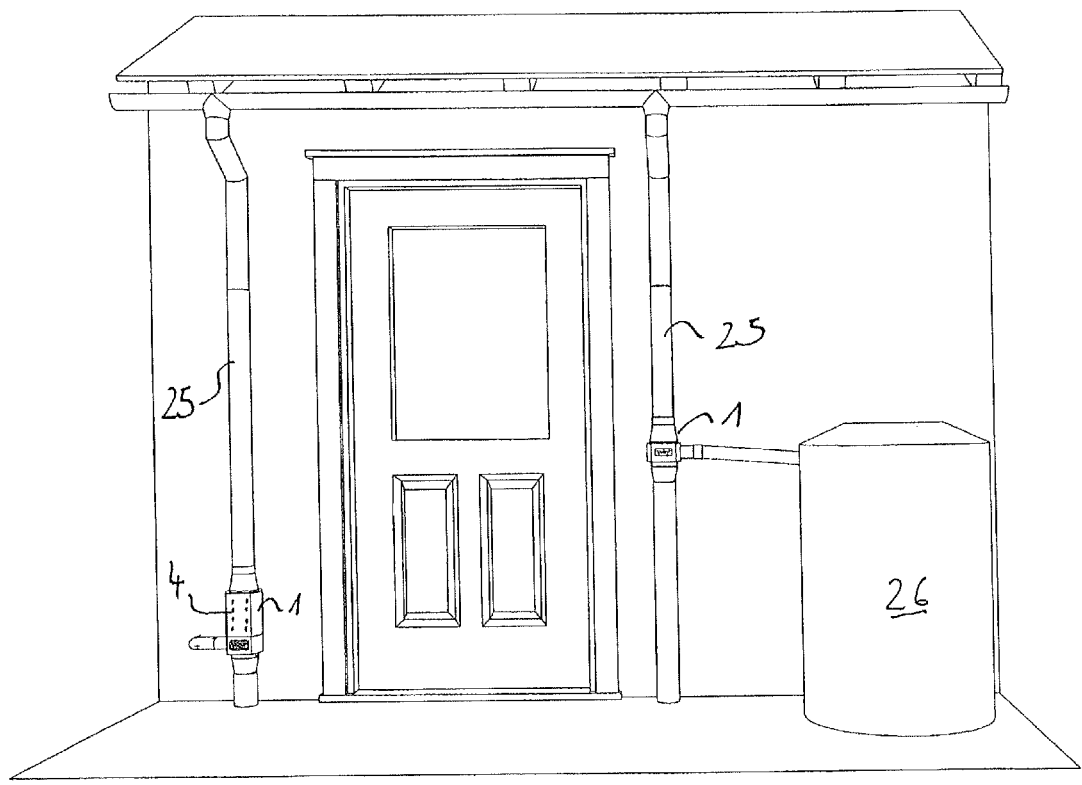
FIG. 3 shows a schematic diagram of the possible uses of the system.

FIG. 3 shows again the two possible uses in principle. On the left downpipe 25, the rainwater separator 1 has a screen 4 according to an assembly arrangement of the parts described in conjunction with FIG. 1, so that the water diverted from the collecting basin is sent into the house, where it can be used as non-potable water, e.g., for flushing the toilet. At the right of the door, the water separator does not have a screen and thus corresponds to an assembly arrangement of parts, such as those described in conjunction with FIG. 2. The water diverted from the rainwater separator is sent to a rain barrel 26, from which water is removed for watering the garden.

LIST OF REFERENCE NUMERALS 1 rainwater separator
3 housing tube
4 screen
5 ring-shaped lid
6 inlet connection
7 downpipe
8 bottom
9 outlet connection
10 helical grooves
12 collecting basin
13 water outlet
14 inside wall
15 outside wall
16 web
20 coarse screen
21 outer edge
22 inner edge
23 openings
24 webs
25 downpipe
26 rain barrel

The invention claimed is:

1. A rainwater separator for a downpipe, comprising:
a cylindrical screen;
a housing tube;

a tubular lid defining a central passage having an inlet connection;

a tubular collecting basin which has an inside wall and an outside wall and which forms a central water outlet;

wherein the outside wall of the collecting basin and an upper edge of the housing tube have a same contour such that the lid is placeable on the housing tube as well as on the collecting basin, forming a tight seal such that the separator housing may be assembled in two arrangements;

wherein in a first assembly arrangement:
- the screen is disposed in the housing tube concentrically with a longitudinal axis of the housing tube such that an annular space is formed between the screen and the housing tube,
- the annular space is sealed by the collecting basin on a bottom side of the annular space and wherein the screen sits on an edge of the inside wall of the collecting basin,
- a lower edge of the inlet connection of the lid is disposed in an upper end face of the screen, and
- wherein the lid is placed on the housing tube; and wherein in a second assembly arrangement:
- the lid is placed directly on the outside wall of the collecting basin such that the lower edge of the inlet connection is disposed on an outside radially of the inside wall of the collecting basin so that rainwater can enter the collecting basin directly, and
- the screen and the housing tube are not included in the second assembly arrangement.

2. The rainwater separator according to claim 1, wherein, in the second assembly arrangement, the lower edge of the inlet connection is inserted into the collecting basin.

3. The rainwater separator according to claim 1, wherein the screen has a downward conical taper and wherein a diameter of the lower edge of the inlet connection is smaller than a largest diameter of the screen such that, in the first assembly arrangement, the lower edge of the inlet connection runs over a conical inside wall of the screen in a vertical projection.

4. The rainwater separator according to claim 1, further comprising a tubular coarse screen, wherein in the second assembly arrangement, the coarse screen is disposed between the lower edge of the inlet connection and the inside wall of the collecting basin.

5. The rainwater separator according to claim 1, wherein the inside wall of the inlet connection includes a plurality of grooves or webs running in a helical arrangement.

6. The rainwater separator according to claim 1, wherein an outside contour of the lid, the housing tube, and the collecting basin each have a corresponding rectangular or elliptical cross-section.

7. The rainwater separator according to claim 6, wherein the respective contours are each formed by two line segments running parallel and two convex curvatures connecting the line segments to one another.

* * * * *